United States Patent

Liubakka et al.

[11] Patent Number: 5,904,222
[45] Date of Patent: May 18, 1999

[54] VARIABLE ASSIST POWER STEERING USING VEHICLE SPEED AND STEERING PRESSURE

[75] Inventors: Michael K. Liubakka, Livonia; Timothy G. Offerle, Whittaker; Paul Sisko, W. Bloomfield, all of Mich.

[73] Assignee: Ford Motor Company, Dearborn, Mich.

[21] Appl. No.: 08/743,869

[22] Filed: Nov. 6, 1996

[51] Int. Cl.⁶ .................................................. B62D 5/06
[52] U.S. Cl. ........................... 180/422; 180/441; 701/41
[58] Field of Search .................... 180/421, 422, 180/423, 428, 441; 701/41

[56] References Cited

U.S. PATENT DOCUMENTS

| | | | |
|---|---|---|---|
| 4,331,211 | 5/1982 | Lang | 180/141 |
| 4,561,521 | 12/1985 | Duffy | 180/142 |
| 4,570,736 | 2/1986 | Waldorf | 180/143 |
| 4,645,026 | 2/1987 | Adams | 180/132 |
| 4,676,334 | 6/1987 | Nakamura et al. | 180/142 |
| 4,705,132 | 11/1987 | Tsuchiya | 180/148 |
| 4,760,892 | 8/1988 | Duffy | 180/142 |
| 4,768,605 | 9/1988 | Miller et al. | 180/143 |
| 4,779,693 | 10/1988 | Takahashi et al. | 180/140 |
| 4,828,067 | 5/1989 | Duffy | 180/142 |
| 4,877,099 | 10/1989 | Duffy | 180/142 |
| 4,913,250 | 4/1990 | Emori et al. | 180/79 |
| 4,914,913 | 4/1990 | St. Germain et al. | 60/384 |
| 4,926,956 | 5/1990 | Duffy | 180/142 |
| 4,940,103 | 7/1990 | Momiyama | 180/132 |
| 5,029,513 | 7/1991 | Duffy | 91/31 |
| 5,080,186 | 1/1992 | Elser et al. | 180/142 |
| 5,123,497 | 6/1992 | Yopp et al. | 180/142 |
| 5,135,068 | 8/1992 | Emori et al. | 180/132 |
| 5,168,949 | 12/1992 | Emori et al. | 180/143 |
| 5,259,474 | 11/1993 | Emori | 180/132 |
| 5,301,766 | 4/1994 | Momiyama et al. | 180/197 |
| 5,307,892 | 5/1994 | Phillips | 180/79.1 |
| 5,311,432 | 5/1994 | Momose | 364/424.05 |
| 5,372,214 | 12/1994 | Haga et al. | 180/422 |
| 5,392,875 | 2/1995 | Duffy | 180/132 |
| 5,452,642 | 9/1995 | Dymond | 91/375 R |
| 5,494,127 | 2/1996 | Dymond | 180/141 |
| 5,503,240 | 4/1996 | Hong | 180/79.1 |
| 5,558,177 | 9/1996 | Inaguma et al. | 180/422 |
| 5,564,516 | 10/1996 | Nimblett et al. | 180/421 |
| 5,659,473 | 8/1997 | Noro et al. | 180/422 |
| 5,749,431 | 5/1998 | Peterson | 180/422 |
| 5,762,159 | 6/1998 | Matsuoka et al. | 180/421 |

*Primary Examiner*—Anne Marie Boehler
*Attorney, Agent, or Firm*—Roger L. May; R. L. Coppiellie; Gregory P. Brown

[57] ABSTRACT

A variable assist power steering system (10) uses both vehicle speed and steering valve inlet pressure to vary the steering assist provided. A system controller (30) receives speed and pressure data from sensors (24, 26) and produces a control signal for an actuator (28) that shunts fluid flow from the pump (22) to the steering valve (20) thereby affecting steering valve pressure which controls the rack piston (16) which changes the angle of the front vehicle wheels used for steering. The controller (30) employs a calibration table (32) with entries representing actuator current, vehicle speed and inlet pressure wherein the speed and pressure fall into ranges defined by equally spaced speed points and equally or unequally spaced pressure points. Having pressure points spaced with a distance between any two sequential points a power of two in sensor counts allows manageable bilinear interpolation of current versus speed and pressure without complicated divide operators.

9 Claims, 6 Drawing Sheets

5,904,222

VARIABLE ASSIST POWER STEERING USING VEHICLE SPEED AND STEERING PRESSURE

FIELD OF THE INVENTION

This invention relates generally to vehicles, and, more particularly, to vehicle power steering systems for varying the amount of steering assist provided.

BACKGROUND OF THE INVENTION

The amount of force output required by a steering system is proportional to the lateral load on the front axle. At speed, the lateral load is generated primarily by the lateral acceleration of the vehicle. The force output of the power steering system is generated by the assist pressure and force input by the driver. The type of steering maneuver a vehicle is performing can be determined by observing the assist pressure, its change with time, and the vehicle speed. With this information a variable assist power steering system can provide the optimum input force to output force relationship for a given steering maneuver. Unfortunately, conventional variable assist power steering systems use only vehicle speed as an input to the electronic control module and the input to output force relationships remain constant for a given vehicle speed. Consequently, these relationships are a compromise and may not be ideal for any one condition. Accordingly, it will be appreciated that it would be highly desirable to have a power steering system that uses more than vehicle speed as an input to the electronic control module so the input force to output force relationships more accurately reflect driving conditions.

SUMMARY OF THE INVENTION

The present invention is directed to overcoming one or more of the problems set forth above. Briefly summarized, according to one aspect of the present invention, a variable assist power steering system for a vehicle comprises a steering rack assembly that has a piston and is coupled to the steering wheel to steer the vehicle in response to movement of the steering wheel. A steering valve has an inlet for receiving pressurized fluid for effecting displacement of the piston by metering fluid to the piston in response to movement of the steering wheel thereby providing steering assist. Sensors sense vehicle speed producing a speed signal and sense fluid pressure at the steering valve inlet producing an inlet pressure signal. A microprocessor based controller receives the pressure and speed signals and delivers a control signal that is a function of both vehicle speed and inlet pressure to a steering actuator that is responsive to the control signal for varying steering valve inlet pressure and thereby varying steering assist.

The controller includes a calibration table containing entries representing actuator current values, inlet pressure and vehicle speed. The controller determines a pressure range into which inlet pressure falls, determines a speed range into which vehicle speed falls, obtains table entries bounding the speed and pressure ranges and produces four current values. It performs two linear interpolations on the current values for desired actuator current as a function of vehicle speed producing two current values, and performs a linear interpolation on the two current values for desired actuator current as a function of inlet pressure producing a desired current value from which closed loop actuator command PWM is computed for desired current using actual value for actuator current. The output PWM voltage controls the actuator.

According to another aspect of the invention, a method for controlling an actuator for varying steering assist fluid pressure in a power steering system for a vehicle comprises setting up a calibration table containing entries representing actuator current as a function of vehicle speed and inlet pressure; determining ranges into which sensed vehicle speed and inlet pressure, fall; obtaining table entries bounding the speed and pressure ranges and producing four current values; performing linear interpolations on the current values as a function of vehicle speed producing two current values; performing a linear interpolation on the two current values as a function of inlet fluid pressure producing a desired current value; computing closed loop actuator command PWM for desired actuator current using actual value for actuator current; and outputting actuator PWM voltage to the actuator to vary steering assist fluid pressure.

The method includes setting up a plurality of speed ranges and pressure ranges, and defining each of the pressure ranges with two pressure entries with the distance between any two sequential pressure entries being a power of two in sensor counts. It implements a bilinear interpolation table of assist command versus speed and pressure that facilitates high resolution for table calibration without the prohibitive memory requirements of a very large table and without implementing a complicated divide.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
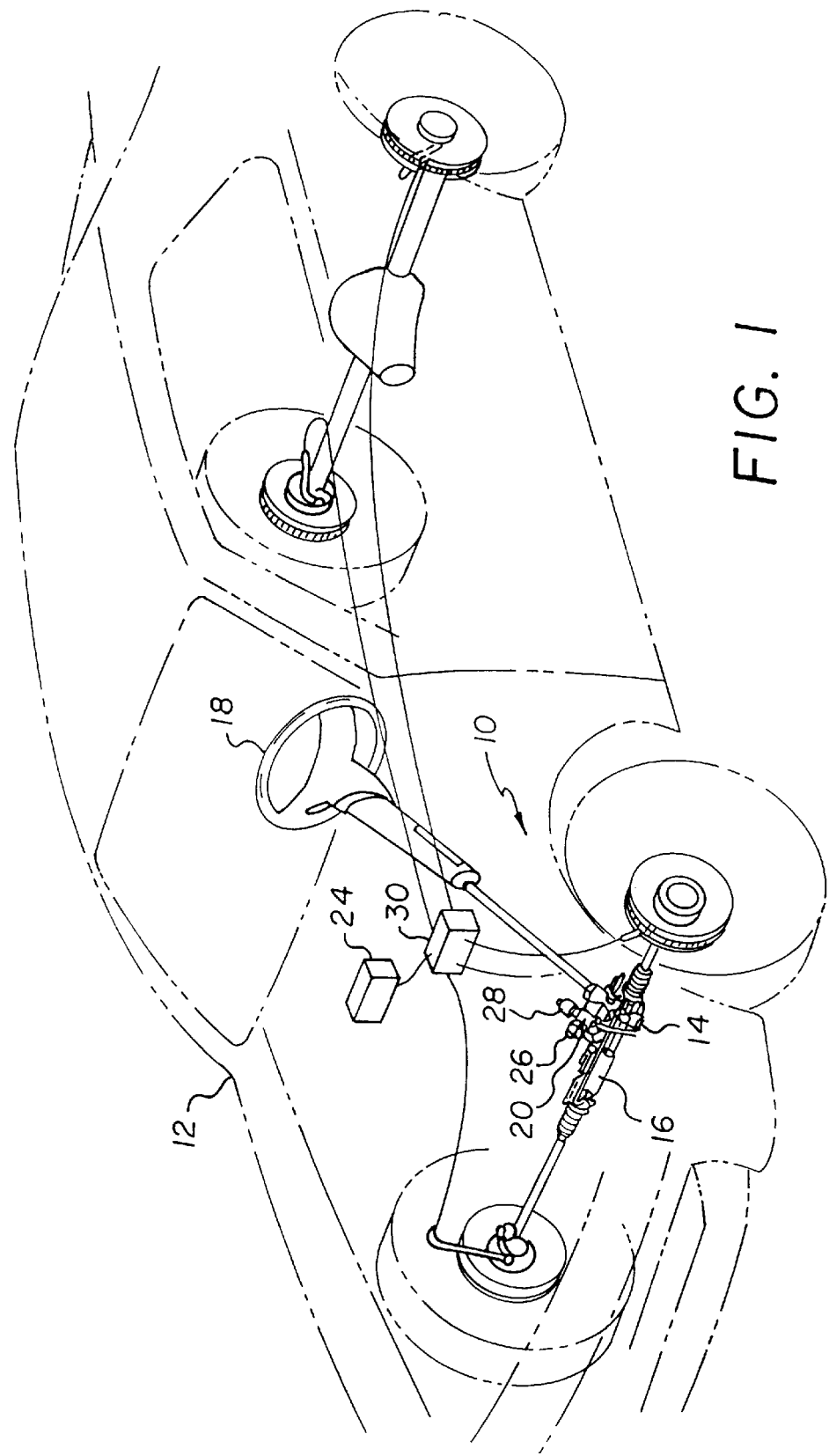
FIG. 1 a diagrammatic perspective view of a vehicle equipped with a variable assist power steering system according to the present invention.
Figure 2:
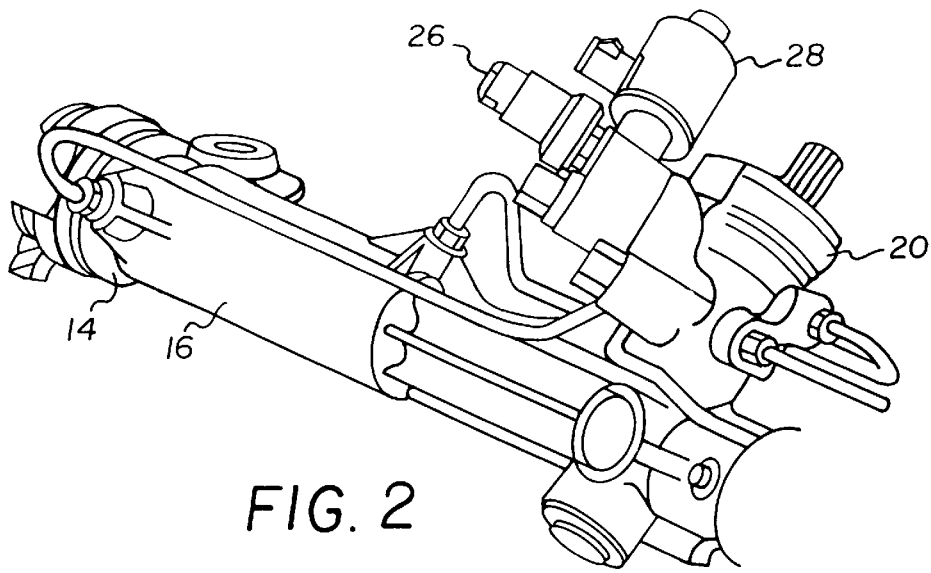
FIG. 2 is more detailed view of the steering rack, actuator and pressure sensor of the steering system of FIG. 1.
Figure 3:
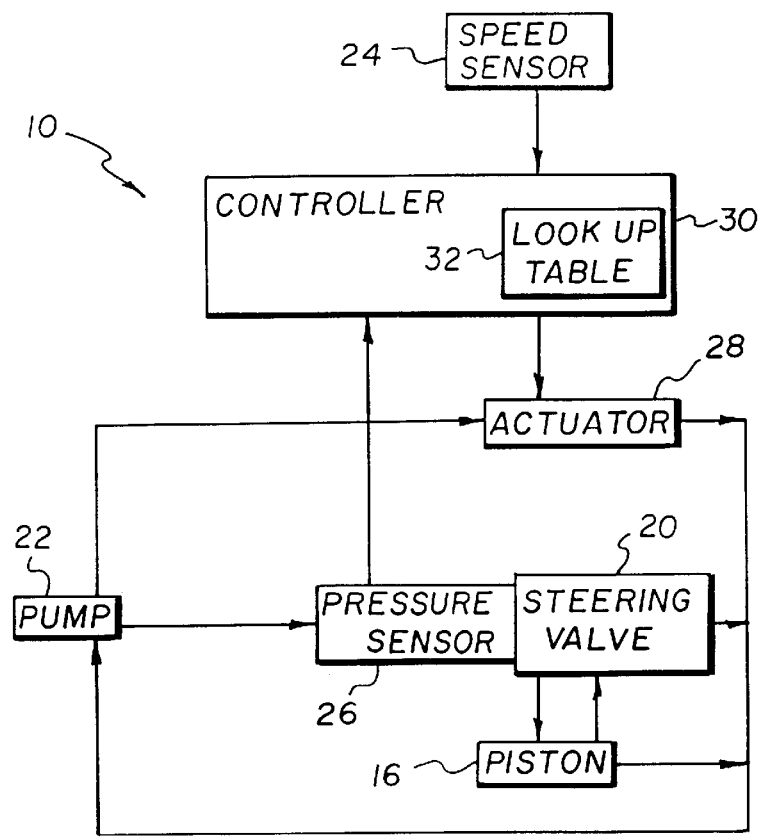
FIG. 3 is a block diagram illustrating the steering system of FIG. 1.

Referring to FIGS. 1–3, a variable assist power steering system 10 for a vehicle 12 has a steering rack assembly 14 that has a piston 16 and is coupled to a steering wheel 18 to steer the vehicle 12 in response to movement of the steering wheel 18. A steering valve 20 has an inlet for receiving pressurized fluid from a pump 22 for effecting displacement of the piston 16. As the piston 16 moves, the angle of the front wheels 22 of the vehicle 12 change to alter the path of the vehicle. The steering valve 20 meters fluid to the piston 16 in response to movement of the steering wheel thereby providing steering assist. In effect, it multiplies steering wheel torque applied by the driver so that altering the vehicle path is less burdensome to the driver.

Sensors are used to detect, sense or measure various vehicle operating conditions including vehicle speed and steering valve inlet pressure. Speed sensor 24 may be of any variety typically used to sense vehicle speed, but a sensor not subject to wheel slip is preferred. A signal generator driven by the power train of the vehicle is one such sensor, and a radar unit is another. Sensor 24 forms a means for sensing vehicle speed and producing a speed signal. Pressure sensor 26 provides a means for sensing fluid pressure at the inlet to the steering valve 20 inlet and producing an inlet pressure signal.

A steering actuator 28 responds to a control signal for varying steering valve inlet pressure to vary the amount of steering assist. The control signal is generated by a microprocessor based controller 30 forming a control means for receiving the inlet pressure signal and the vehicle speed signal and outputting the control signal as a function of both vehicle speed and inlet pressure.

Figure 5:
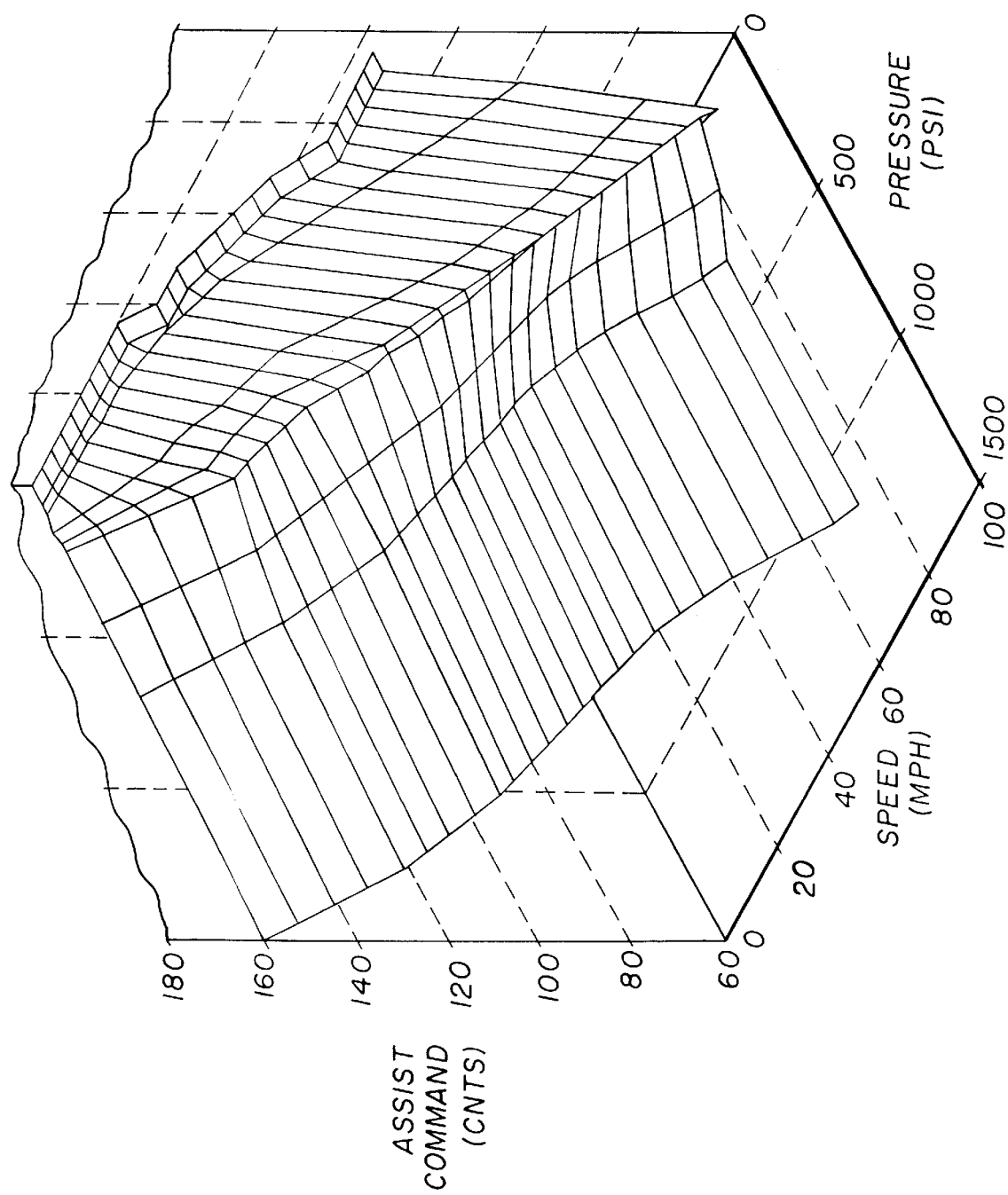
FIG. 5 graphically illustrates a calibration table wherein actuator current, represented as assist command counts, is a function of both vehicle speed and steering gear inlet pressure.

Referring to FIGS. 3 and 5, the controller 30 includes a calibration table 32 containing entries representing actuator current values, inlet pressure values and vehicle speed values. FIG. 5 is a three dimensional graphical representation of the relationship between the output of the controller represented by assist command counts plotted on one axis, vehicle speed plotted on a second axis and inlet pressure plotted on a third axis. For any measured values of speed and pressure, there is an optimum actuator current. The data define a continuous three dimensional surface, however, to simplify computation of actuator current using the measured values of speed and pressure, they are divided into ranges. As illustrated, the lines extending generally parallel to the pressure axis define speed ranges which are all equal. On the other hand, the lines extending generally parallel to the speed axis and intersecting the lines defining the speed range lines define unequal pressure ranges.

The simplest implementation of the three dimensional graph for the bilinear interpolation of actuator current versus speed and pressure requires equally spaced points in both directions, speed and pressure, which would demand tables too large for the pressure resolution required. An interpolation table with unequally spaced points could be directly implemented if a fast divide operator was available at reasonable cost, but this is not the case for the inexpensive microprocessors to be used in controller 30 for automotive applications where cost and value must always be considered. Thus, a solution is to have equally spaced points versus speed in increments of 4 mph for 0 mph to 96 mph, and to have equally or unequally spaced points versus pressure with the restriction that the distance between any two sequential pressure points be a power of 2 in sensor counts. Powers of 2 in any other units could also be used. This eliminates the need for a divide operator permitting an expensive divide operator to be replaced by much less expensive counted algebraic shifts. Resolution of about 7 psi for table areas with high curvature has been obtained using less than 10 pressure points between 0 psi and 1500 psi because the tables become very flat at high pressures.

Figure 6:
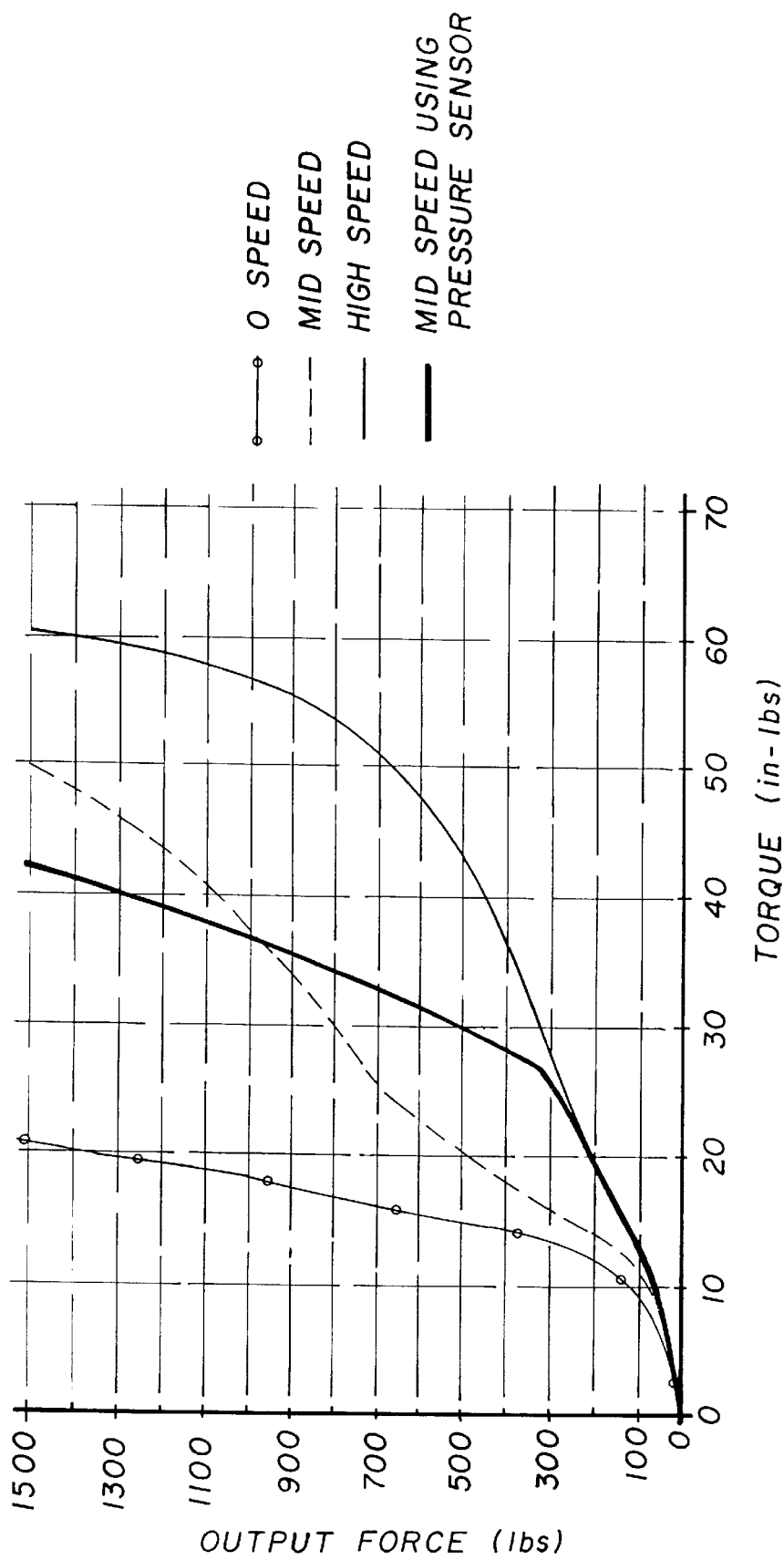
FIG. 6 graphically illustrates steering gear output force as a function of steering wheel torque comparing the steering system of FIG. 1 using both speed and pressure with prior steering systems using speed alone.

FIG. 6 graphically illustrates steering gear output force as a function of steering wheel torque comparing the steering system of FIG. 1, which uses both speed and pressure, with prior steering systems using speed alone. With prior systems, more output force is provided for a given force input at low speeds than at high speeds. With the present invention, the assist is kept in the high speed mode until the assist pressure reaches a predetermined level. The assist is then increased by an amount determined by assist pressure and vehicle speed. The resulting input/output force relationship provides for decreased gain at low torques for improved steering feel while providing increased assist at high input torques.

Figure 7:
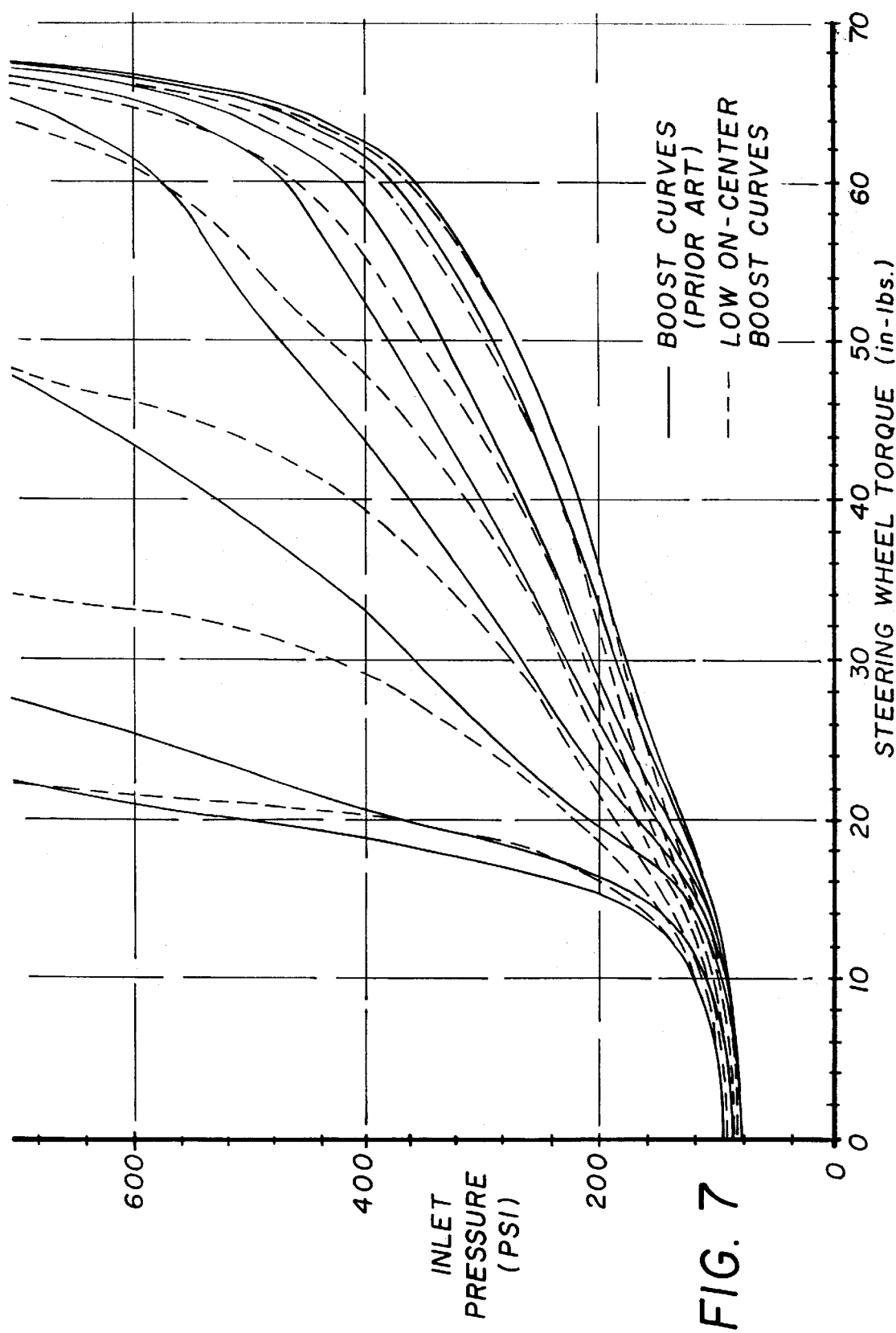
FIG. 7 graphically illustrates two sets of curves for steering gear inlet pressure as a function of steering wheel torque where one set is of prior art speed only dependent curves and the other set is of electronically modified curves using a pressure input.

The variable assist power steering system has the ability to adjust steering efforts based on inlet pressure and vehicle speed for on-center, low G cornering, high G cornering, and parking efforts which can be separately controlled through table calibration. FIG. 7 graphically illustrates how steering gear inlet pressure as a function of steering wheel torque can be electronically modified to provide more assist on-center, identified by the higher inlet pressure at low steering wheel torques.

FIGS. 5 and 7 respectively show a light-on-center calibration table and the resulting light-on-center boost curves. The light on-center curves are shown in comparison to speed only curves. With the calibration table it is possible to separately adjust the efforts for different levels of vehicle speed. Thus, the shape of the table in FIG. 5 versus pressure determines the steering efforts for different levels of lateral acceleration, (i.e., low pressure corresponds to on-center, midrange pressure corresponds to low-G cornering, and high pressure corresponds to high-G cornering or parking). Several different tables may be preprogrammed and stored in memory in the controller to be selected during driving.

Figure 4:
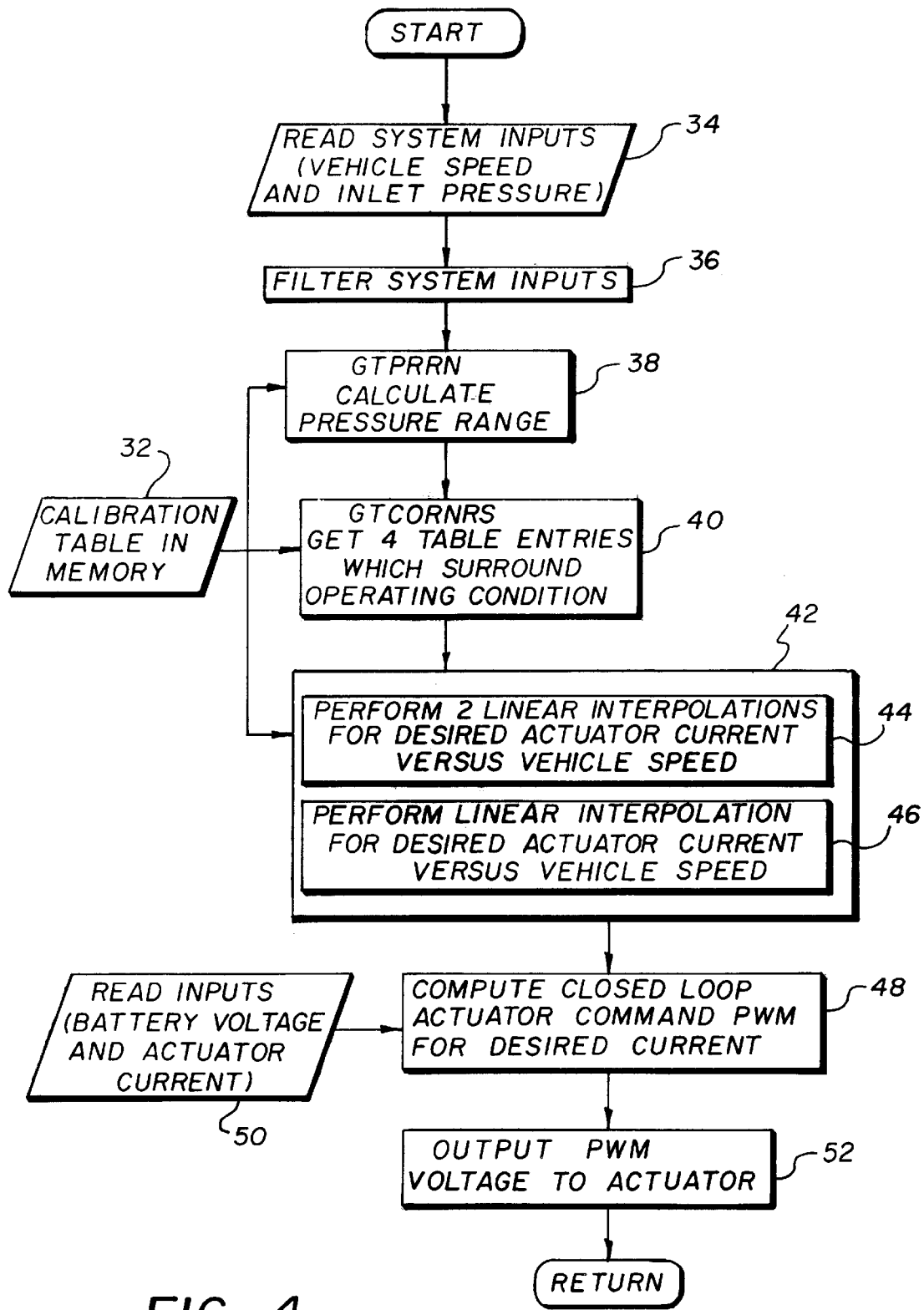
FIG. 4 is a flow chart illustrating a control algorithm for the variable assist power steering system of FIGS. 1–3 using both speed and pressure.

FIG. 4 is a flow chart illustrating operation of the variable assist power steering system. The algorithm contains several subroutines that compute and filter vehicle speed and compute and filter inlet pressure. It determines which range the measured pressure is in, modifies speed input to the table, and gets the four values of current bounding the present speed and pressure. It then interpolates the four values and generates actuator current.

For illustration, assume a 25 by 10 speed by pressure table. At start up, the vehicle speed and inlet pressure signals are read at block 34, along with other system inputs, and conditioned and filtered at lock 36. The table is called up. At block 38 subroutine GTPRRN gets the pressure range. It determines which range the measured pressure is in relative to the present look-up table pressure points. For example, for 10 pressure points, there are 11 pressure ranges, 0 through 10, with pressure range 0 existing where the sensed pressure is less than the first pressure point; that is:

sensed pressure≦X(1)=pressure range 0, where X(1) is the first pressure point. Similarly, X(1)<sensed pressure≦X(2)=pressure range 1; and X(10)<sensed pressure=pressure range 11, where X(2) is the second pressure point and X(10) is the highest pressure point. At this time, the speed input to the look-up table is modified by some function so that modified speed is a function of speed and the calibration potentiometer.

At block 40 subroutine GTCORNRS gets the four corners that are values of actuator current from the look-up table that bound the present speed and pressure operating point. The four corners exists because the operating point is defined in terms of speed and pressure each of which falls into a range. So, the pressure point falls into one of the 11 pressure ranges, each of which is bounded by two pressures, and the speed point falls into one of the 26 speed ranges, each of which is bounded by two speeds.

At block 42 subroutine BIINTRP performs bilinear interpolation of the actuator current between the four corner points obtained at block 40. It performs two linear interpolations of actuator current versus speed first at block 44, then linearly interpolates between these two actuator currents using pressure at block 46. Where pressure is in pressure range 0 or pressure range 11, then no interpolation over pressure is required. Calculations are performed in unsigned 8-bit arithmetic, instead of signed 8-bit, to maintain maximum resolution. Preferably, rounding is performed after all shift rights or division by $2_n$. The output is the controller output and is the desired actuator current for the inlet pressure and vehicle speed.

The desired actuator current is input for subroutine GENIDAL at block 48 which generates the commanded actuator current from the desired current and other inputs from block 50 such as vehicle battery voltage and actual actuator current. Closed loop actuator command PWM for desired current is computed and output to block 52 where the output PWM voltage is applied to the actuator to vary steering assist.

It can now be appreciated that a variable assist power system apparatus and method using both vehicle speed and steering valve inlet pressure has been presented. The steering apparatus includes a steering rack assembly that has a piston and is coupled to the steering wheel to steer the vehicle in response to movement of the steering wheel, a steering valve having an inlet for receiving pressurized fluid for effecting displacement of the piston with the steering valve metering fluid to the piston in response to movement of the steering wheel thereby providing steering assist. The apparatus includes a speed sensor for sensing vehicle speed and producing a speed signal, a pressure sensor for sensing fluid pressure at the steering valve inlet and producing an inlet pressure signal, a controller for receiving the inlet pressure signal and the vehicle speed signal and outputting a control signal that is a function of both vehicle speed and inlet pressure, and a steering actuator responsive to the control signal for varying steering valve inlet pressure and thereby varying steering assist.

The method for controlling an actuator for varying steering assist fluid pressure in a power steering system for a vehicle includes the steps of: sensing vehicle speed; sensing steering assist fluid pressure; sensing actuator current; setting up a calibration table containing entries representing actuator current, vehicle speed and inlet pressure; determining a speed range into which vehicle speed falls; determining a pressure range into which sensed steering assist fluid pressure falls; obtaining table entries surrounding the speed and pressure ranges and producing four current values; performing two linear interpolations on the current values for desired actuator current as a function of vehicle speed and producing two current values; performing a linear interpolation on the two current values for desired actuator current as a function of steering assist fluid pressure and producing a desired current value; computing a closed loop actuator command PWM for desired actuator current using actual value for actuator current; and outputting actuator PWM voltage to the actuator to vary steering assist fluid pressure.

The method includes setting up a plurality of equal speed ranges and setting up a plurality of equally or unequally spaced pressure ranges, and defining each of the pressure ranges with two pressure entries with the distance between any two sequential pressure entries being a power of two in sensor counts. The method implements a bilinear interpretation table of assist command versus speed and pressure that facilitates high resolution for table calibration without the cost prohibitive memory requirements of a very large table and without requiring a divide.

The variable assist power steering system has the ability to adjust steering efforts based on inlet pressure and vehicle speed for on-center, low G cornering, high G cornering, and parking efforts which can be separately controlled through table calibration. A method has been described for implementing a bilinear interpolation table of assist command versus speed and pressure which allows high resolution for table calibration without the memory requirements of a very large table and without requiring a divide operator.

While the invention has been described with particular reference to the preferred embodiments, it will be understood by those skilled in the art that various changes may be made and equivalents may be substituted for elements of the preferred embodiments without departing from invention. For example, the calibration table need not have equal speed ranges in increments of 4 mph up to 96 mph. There may be equal ranges up to an upper limit based on highway speed limits and a single range above that with minimal power steering assist. This would allow smaller increments than 4 mph or fewer speed points to simplify the table. The pressure points can be equally or unequally spaced as long as the difference between adjacent points is a power of two in some arbitrary set of units. Additionally, there are no restrictions on speed or pressure point separation for implementation of the basic algorithm, but implementing the basic algorithm as specified minimizes the cost and speed of implementation. It is accordingly intended that the claims shall cover all such modifications and applications as do not depart from the true spirit and scope of the invention.

What is claimed is:

1. A variable assist power steering system for a vehicle, comprising:

a steering rack assembly having a piston and being coupled to a steering wheel to steer said vehicle in response to movement of said steering wheel;

a steering valve having an inlet for receiving pressurized fluid for effecting displacement of said piston, said steering valve metering fluid to said piston in response to movement of said steering wheel thereby providing steering assist;

means for sensing vehicle speed and producing a speed signal;

means for sensing fluid pressure at said steering valve inlet and producing an inlet pressure signal;

a steering actuator for varying steering valve inlet pressure and thereby varying steering assist;

a calibration table containing entries representing actuator current values, inlet pressure and vehicle speed;

means for determining a pressure range into which inlet pressure falls as indicated by said inlet pressure signal;

means for determining a speed range into which vehicle speed falls as indicated by said vehicle speed signal;

means for obtaining table entries bounding said speed and pressure ranges and producing four current values;

means for performing two linear interpolations on said current values for desired actuator current as a function of vehicle speed and producing two current values;

means for performing a linear interpolation on said two current values for desired actuator current as a function of inlet pressure and producing a desired current value;

means for computing closed loop actuator command PWM for desired current using actual value for actuator current; and means for outputting PWM voltage to said actuator as said control signal, said steering actuator responding to said control signal which is a function of both vehicle speed and inlet pressure to vary steering valve inlet pressure and thereby vary steering assist.

2. A variable assist power steering system for a vehicle, comprising:

a steering rack assembly having a piston and being coupled to a steering wheel to steer said vehicle in response to movement of said steering wheel;

a steering valve having an inlet for receiving pressurized fluid for effecting displacement of said piston, said steering valve metering fluid to said piston in response to movement of said steering wheel thereby providing steering assist;

means for sensing vehicle speed and producing a speed signal;

means for sensing fluid pressure at said steering valve inlet and producing an inlet pressure signal;

a steering actuator for varying steering valve inlet pressure and thereby varying steering assist;

a calibration table containing entries representing actuator current values;

means for determining a pressure range into which inlet pressure falls as indicated by said inlet pressure signal from among a low pressure range, intermediate pressure ranges and high pressure range;

means for determining a speed range into which vehicle speed falls, as indicated by said vehicle speed signal, from among a plurality of speed ranges;

means for obtaining table entries bounding said speed and pressure ranges into which current vehicle speed and inlet pressure fall and producing four current values for desired actuator current when said bounded pressure range is one of said intermediate ranges and producing two current values when said bounded pressure range is one of said low and high ranges;

means for performing two linear interpolations on said current values for desired actuator current as a function of said vehicle speed and producing two current values when said bounded range is one of said intermediate ranges and for performing zero linear interpolations on said current values for desired actuator current as a function of said vehicle speed and producing two current values when said bounded range is one of said low and high ranges;

means for performing a linear interpolation on said two current values for desired actuator current as a function of inlet pressure and producing a desired current value;

means for determining closed loop actuator command PWM for desired current using actual value for actuator current; and means for outputting PWM voltage to said actuator as said control signal, said steering actuator responding to said control signal which is a function of both vehicle speed and inlet pressure to vary steering valve inlet pressure and thereby vary steering assist.

3. A power steering system, as set forth in claim 2, wherein all of said speed ranges are equal.

4. A power steering system, as set forth in claim 2, wherein all of said pressure ranges are unequal.

5. A power steering system, as set forth in claim 4, wherein each pressure range is defined by two pressure points and with distance between any two sequential pressure points being a power of two in sensor counts.

6. A method controlling an actuator for varying steering assist fluid pressure in a power steering system for a vehicle, comprising the steps of:

sensing vehicle speed;

sensing steering assist fluid pressure;

sensing actuator current;

setting up a calibration table containing entries representing actuator current, vehicle speed and inlet pressure;

determining a speed range into which vehicle speed falls;

determining a pressure range into which sensed steering assist fluid pressure falls;

obtaining table entries surrounding said speed and pressure ranges and producing four current values;

performing two linear interpolations on said current values for desired actuator current as a function of vehicle speed and producing two current values;

performing a linear interpolation on said two current values for desired actuator current as a function of steering assist fluid pressure and producing a desired current value;

computing a closed loop actuator command PWM for desired actuator current using actual value for actuator current; and outputting actuator PWM voltage to said actuator to vary steering assist fluid pressure.

7. The method of claim 6 wherein the step of setting up said calibration table includes the step of setting up a plurality of equal speed ranges.

8. The method of claim 6 wherein the step of setting up said calibration table includes the step of setting up a plurality of unequal pressure ranges.

9. The method of claim 8 including the step of defining each of said pressure ranges with two pressure entries and with distance between any two sequential pressure entries being a power of two is sensor counts.

* * * * *